US00RE37643E

(19) United States
(12) Reissued Patent
Petruchik et al.

(10) Patent Number: US RE37,643 E
(45) Date of Reissued Patent: Apr. 9, 2002

(54) METHOD AND APPARATUS FOR PREVENTING UNAUTHORIZED RECYCLING OF SINGLE-USE CAMERA AND PERMITTING AUTHORIZED REUSE OF THE CAMERA

(75) Inventors: Dwight John Petruchik, Honeoye Falls; Clay Allen Dunsmore, Fairport, both of NY (US)

(73) Assignee: Eastman Kodak Company, Rochester, NY (US)

(21) Appl. No.: 08/713,308

(22) Filed: Sep. 13, 1996

Related U.S. Patent Documents

Reissue of:
(64) Patent No.: 5,418,585
Issued: May 23, 1995
Appl. No.: 08/210,983
Filed: Mar. 21, 1994

U.S. Applications:
(63) Continuation-in-part of application No. 08/181,333, filed on Jan. 14, 1994, now abandoned.

(51) Int. Cl.[7] ..... G03B 17/02
(52) U.S. Cl. ..... 396/6; 396/300

(58) Field of Search ..... 396/6, 297, 298, 396/299, 300

(56) References Cited

U.S. PATENT DOCUMENTS

| | | | | |
|---|---|---|---|---|
| 4,021,828 | A | 5/1977 | Iura et al. | 354/217 |
| 4,561,741 | A | 12/1985 | Ishizaka et al. | 354/21 |
| 4,734,727 | A | 3/1988 | Takemae | 354/412 |
| 5,021,811 | A | 6/1991 | Maurinus et al. | 354/76 |
| 5,049,911 | A | 9/1991 | Shimizu | 354/217 |
| 5,235,366 | A | 8/1993 | Kucmerowski | 354/212 |

FOREIGN PATENT DOCUMENTS

| | | | |
|---|---|---|---|
| JP | 4-226439 | 8/1992 | G03B/17/00 |

*Primary Examiner*—David M. Gary
(74) *Attorney, Agent, or Firm*—Roger A. Fields

(57) ABSTRACT

When an exposure counter in a single-use camera indicates that the maximum number of exposures on a roll of film in the camera have been exposed, a function of the camera such as an electronic flash capability is disabled to prevent unauthorized recycling of the camera. A reset code must be inputted to the camera to initialize the exposure counter and to enable the electronic flash capability, to permit authorized reuse of the camera with another roll of film.

25 Claims, 5 Drawing Sheets

METHOD AND APPARATUS FOR PREVENTING UNAUTHORIZED RECYCLING OF SINGLE-USE CAMERA AND PERMITTING AUTHORIZED REUSE OF THE CAMERA

Matter enclosed in heavy brackets [ ] appears in the original patent but forms no part of this reissue specification; matter printed in italics indicates the additions made by reissue.

[CROSS-REFERENCED TO RELATED APPLICATIONS

This is a continuation-in-part of application Ser. No. 08/181,333, filed Jan. 14, 1994, now abandoned.]*This application is a reissue application for U.S. Pat. No. 5,418,585 issued May 23, 1995, based on application Ser. No. 08/210, 983, filed Mar. 21, 1994, as a continuation-in-part of application Ser. No. 08/181,333, filed Jan. 14, 1994, now abandoned.*

FIELD OF THE INVENTION

The invention relates generally to the field of photography, and in particular to single-use cameras. More specifically, the invention relates to a method and apparatus for preventing unauthorized recycling of a single-use camera after a roll of film in the camera is completely exposed and for permitting authorized reuse of the camera when the roll of film is replaced with another one.

BACKGROUND OF THE INVENTION

Single-use cameras have recently become well known, for example, the "Kodak FunSaver 35 with FLASH". Typically, the single-use camera is a simple point-and-shoot type which comprises a plastic inner body housing a fixed-focus taking lens, a film metering mechanism, a shutter, a frame (exposure) counter, and possibly an electronic flash unit, and a cardboard outer cover containing the inner body and having respective openings for the taking lens, a shutter release button, a film advance thumbwheel, a direct see-through view-finder, the frame counter, and a flash emission window. At the manufacturer, the inner body is loaded with a conventional 12, 24, or 36 exposure 35 mm film cartridge and substantially the entire length of the unexposed filmstrip is factory prewound from the cartridge onto a spool in the inner body. After the photographer takes a picture, he or she manually rotates the thumbwheel to rewind the exposed frame into the cartridge. The rewinding movement of the filmstrip the equivalent of slightly more than one frame rotates a metering sprocket to decrement the frame counter to its next lower numbered setting. Further details of this operation are disclosed in commonly assigned U.S. Pat. No. 5,235,366, issued Aug. 10, 1993. When the maximum number of exposures available on the filmstrip are exposed and the filmstrip is completely rewound into the cartridge, the camera is given to a photofinisher who first removes the filmstrip from the inner body to develop the negatives and then forwards the camera to the manufacturer for recycling. The manufacturer, in turn, recycles the camera by loading it with another roll of film and repeating the foregoing prewinding process.

PROBLEM TO BE SOLVED BY THE INVENTION

There is a need recognized by the industry to prevent unauthorized recycling of single-use cameras.

SUMMARY OF THE INVENTION

The invention among other things relates to a method and apparatus for preventing unauthorized recycling of a single-use camera but permitting authorized reuse of the camera. The method in a general sense comprises the steps of:

determining that a predetermined operation in the camera has occurred;

disabling a function of the camera when it is determined that the predetermined operation in the camera has occurred to prevent reuse of the camera when an exposed roll of film is replaced in the camera with an unexposed one; and inputting an electrical, optical, or magnetic reset code to the camera to make the function that has been disabled re-enabled to permit authorized reuse of the camera with the unexposed roll of film.

In a preferred embodiment, the method comprises the steps of:

maintaining a count, using a counter in the camera, that indicates the number of exposures made and remaining to be made on a roll of film in the camera;

disabling a function of the camera when the count indicates that the roll of film in the camera is completely exposed, to substantially prevent reuse of the camera when the roll of film is replaced with another one;

inputting a reset code to the camera; and initializing the counter and re enabling the function that has been disabled when the reset code is inputted to the camera, to permit authorized reuse of the camera with the other roll of film.

More particularly, the method further comprises the steps of:

reading an identifier code provided in or on the camera before the reset code is inputted to the camera; and selecting the reset code to be one that corresponds only to the identifier code that has been read.

Also, the method may further comprises the step of:

selecting the reset code to be one that matches a non-readable enabling code provided in or on the camera for triggering initializing the counter and re enabling the function that has been disabled when the reset code is inputted to the camera.

ADVANTAGEOUS EFFECT(S) OF THE INVENTION

The invention provides a way to prevent unauthorized recycling of a single-use camera and to permit authorized reuse of the camera.

DETAILED DESCRIPTION OF THE INVENTION

The invention is disclosed as being embodied preferably in a single-use 35 mm camera having a built-in electronic flash unit. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
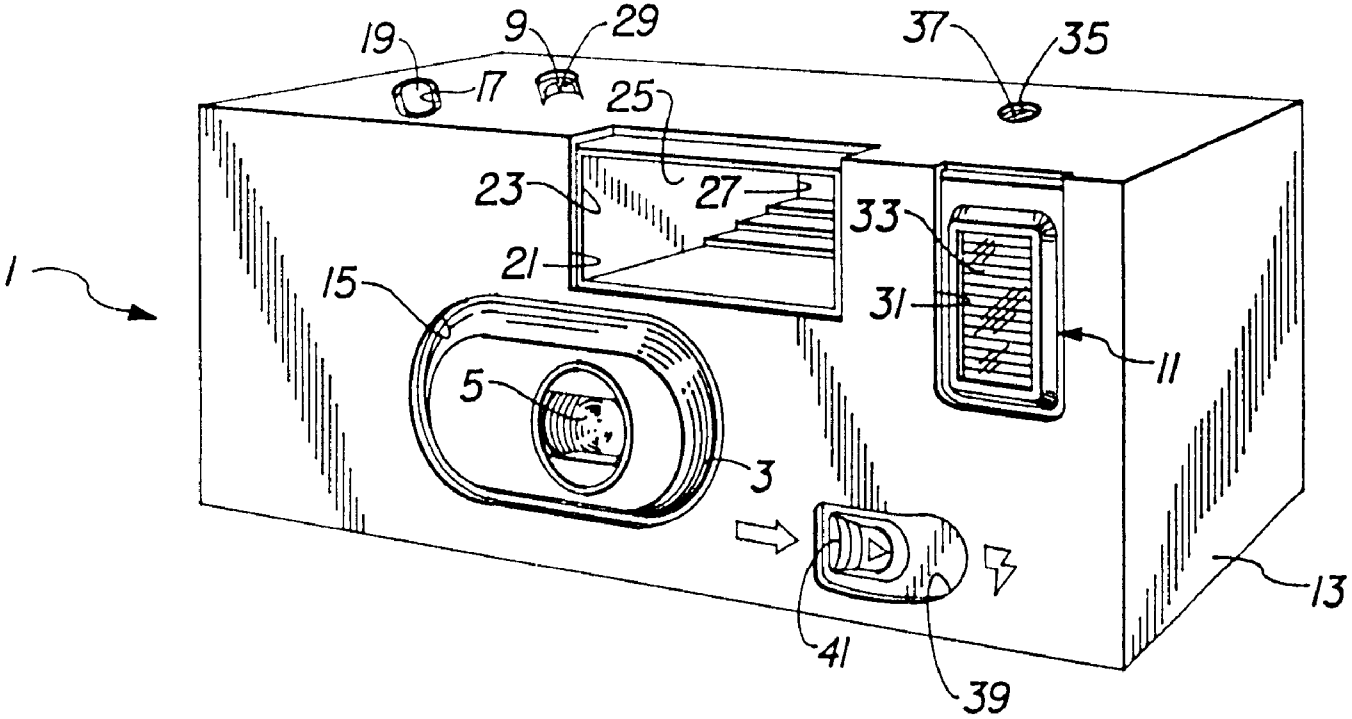
FIG. 1 is a front perspective view of a single-use camera with a built-in electronic flash unit.
Figure 2:
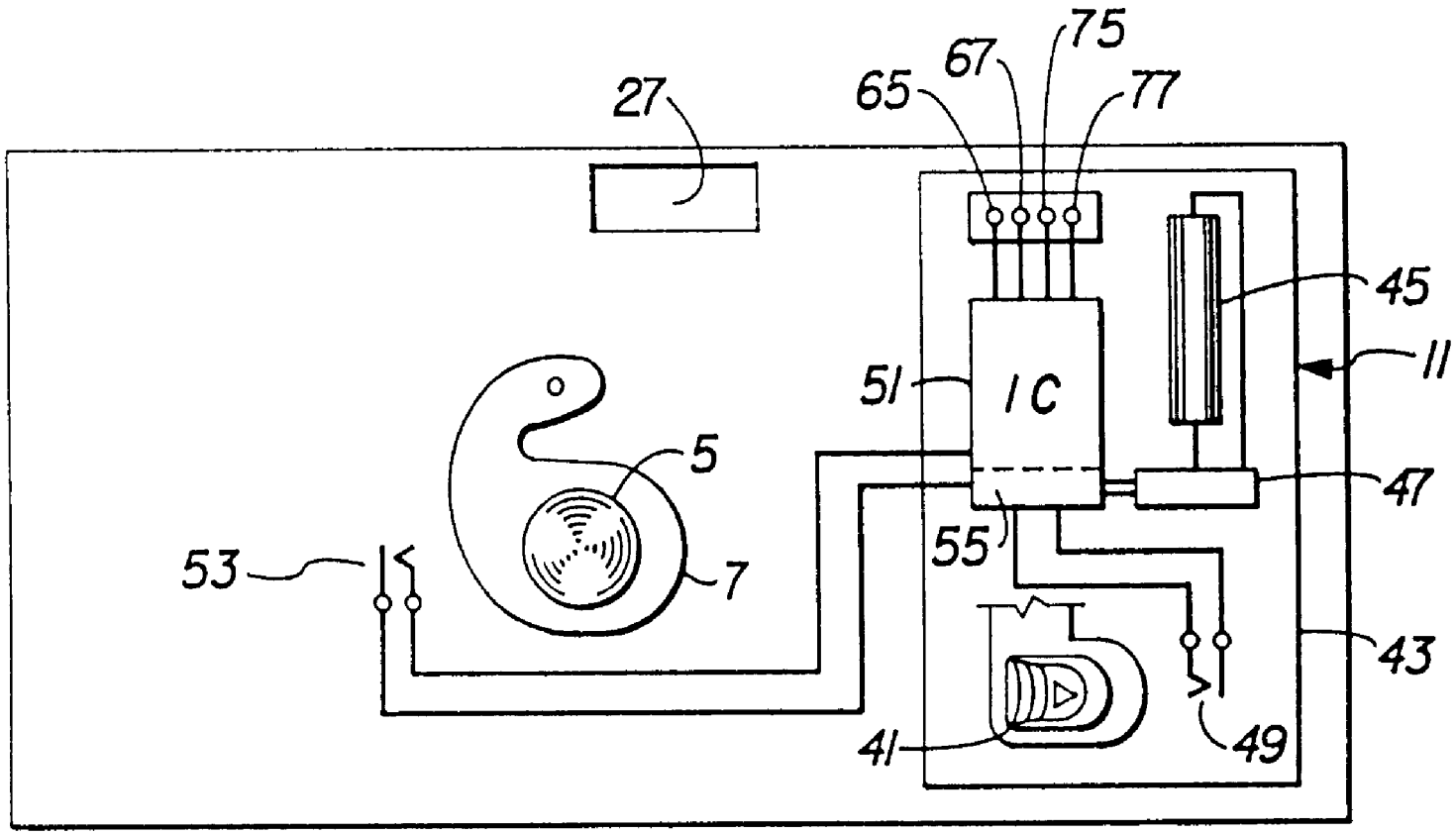
FIG. 2 is a front elevation view of the camera as seen from the inside to show various components that comprise a preferred embodiment of the invention.

Referring now to the drawings, FIGS. 1 and 2 show a single-use camera 1 which comprises a plastic light-tight inner body 3 housing a known fixed-focus taking lens 5, a known film metering mechanism, not shown, a known single-blade shutter 7, a known frame counter 9 for visibly indicating the number of exposures remaining for picture-taking, and an electronic flash unit 11, and a cardboard outer cover or casing 13 containing the inner body and having a front opening 15 for the taking lens, a top opening 17 for a manual shatter release button 19, a rear opening for a manual film advance thumbwheel, not shown, a front opening 21 for a front viewfinder window 23 of a direct see-through viewfinder 25, a rear opening, not shown, for a rear viewfinder window 27, a top opening 29 for the frame counter, a front opening 31 for a flash emission window 33, a top opening 35 for a flash-ready light emitting diode 37, and a front opening 39 for a manual push element 41 which is pushed to the right in FIG. 1 to ready the flash unit.

The flash unit 11 as shown in FIG. 2 includes a flash circuit board 43 on which is mounted a known flash tube 45 located behind the flash emission window 33, a known flash charger circuit 47 for storing a suitable voltage to ignite the flash tube to provide flash illumination, a normally open flash charger circuit switch 49 that is closed by sliding the push element 41 to the right in FIGS. 1 and 2 to activate or energize the flash charger circuit, and an integrated control circuit (IC) 51. The IC 51 is connected to a separate normally open shutter flash synch switch 53 which is closed every time the shutter blade 7 is pivoted clockwise in FIG. 2 to momentarily uncover the taking lens 5 to take a picture.

At the manufacturer, the inner body 3 is loaded with a conventional 12, 24, or 36 exposure 35 mm film cartridge and substantially the entire length of the unexposed filmstrip is factory prewound from the cartridge onto a spool, not shown, in the inner body. Also, the frame counter 9 is set to the maximum number of exposures available on the unexposed filmstrip. After the photographer takes a picture, he or she manually rotates the thumbwheel to rewind the exposed frame into the cartridge. The rewinding movement of the filmstrip the equivalent of slightly more than one frame rotates a metering sprocket, not shown, to decrement the frame counter 9 to its next lower numbered setting, e.g. from "36" to "35". Further details of this operation are disclosed in commonly assigned U.S. Pat. No. 5,235,366, issued Aug. 10, 1993. When the maximum number of exposures available on the filmstrip are exposed and the filmstrip is completely rewound into the cartridge, the camera 1 is given to a photofinisher who first removes the filmstrip from the inner body 3 to develop the negatives and then forwards the camera to the manufacturer for recycling. The manufacturer, in turn, recycles the camera 1 by loading it with another roll of film and repeating the foregoing prewinding process.

Figure 3:
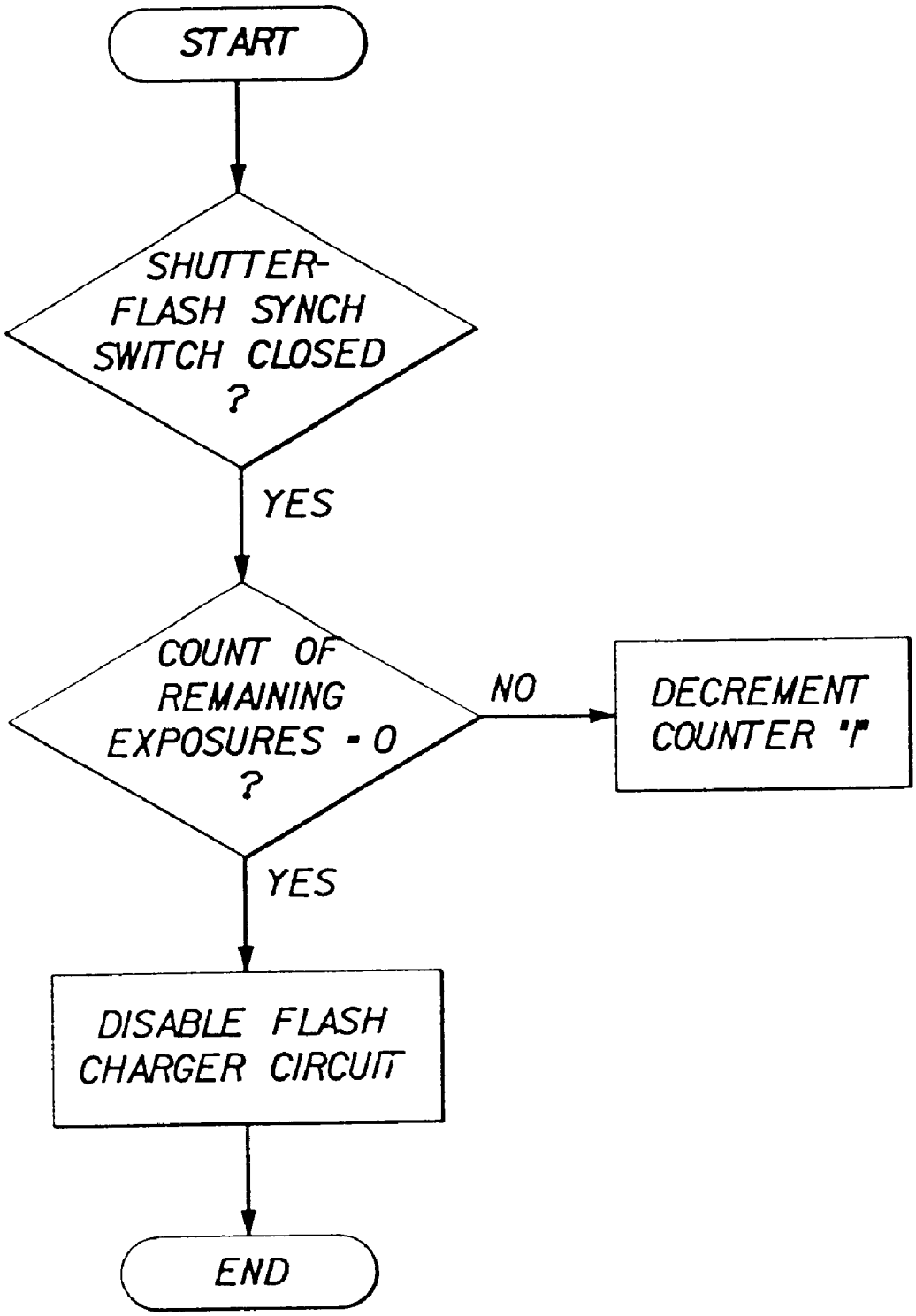
FIG. 3 is a flow chart.

The IC 51 includes a known count-down counter 55 which when initialized is set to the maximum number of exposures available on a roll of film in the camera 1 (similar to the frame counter 9). The counter 55 is adapted to be decremented by "1" when the shutter-flash synch switch 53 is closed by the shutter blade 7 to take a picture, to provide a count of the number of exposures remaining, to be made on the roll of film. As shown in FIG. 3, each time the shutter-flash synch switch 53 is closed, the IC 51 interrogates the counter 55 to determine whether its count is at least "1". If the count is at least "1" the counter 55 is decremented by "1". Conversely, if the counter is "0" the flash charger circuit 47 is disabled.

Figure 4:
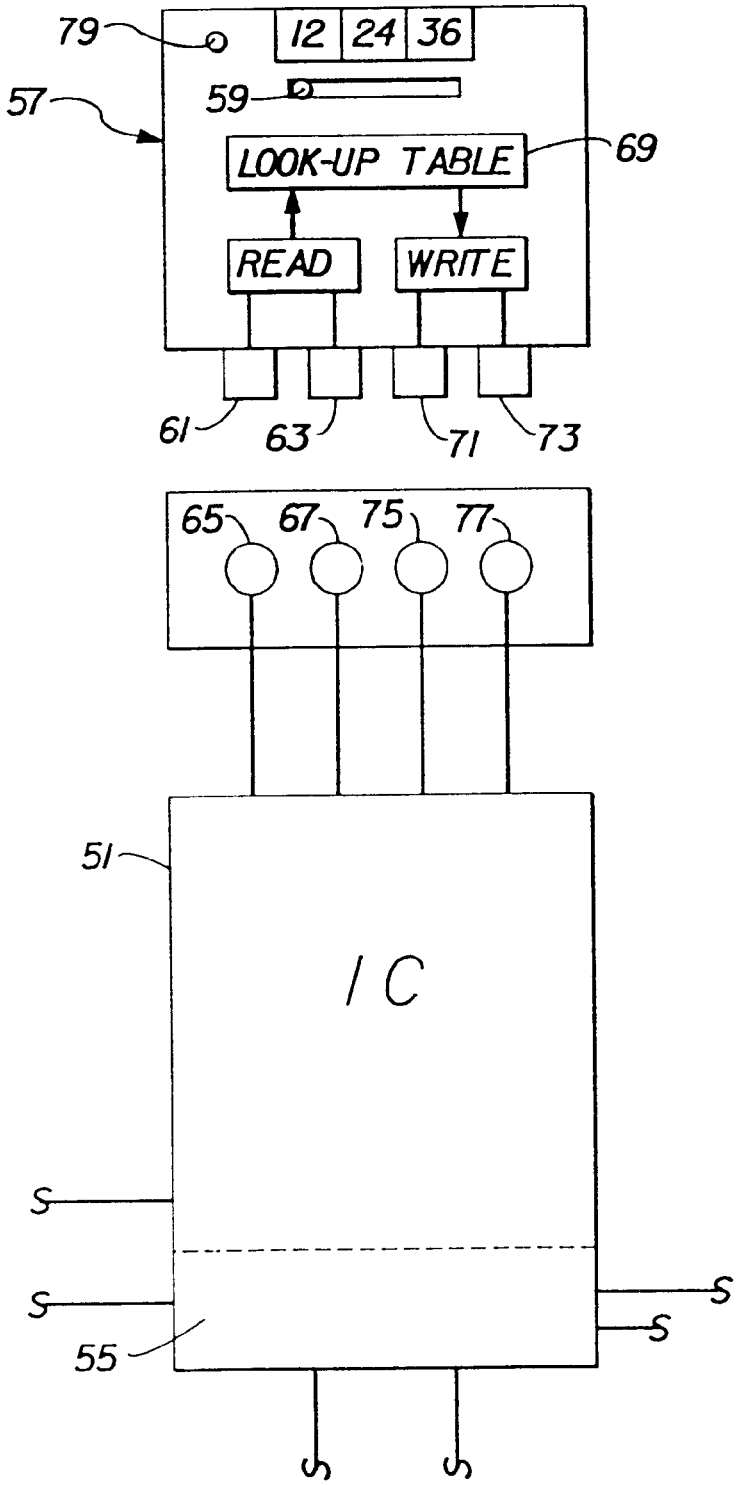
FIG. 4 is a schematic view of other components of the preferred embodiment.
Figure 5:
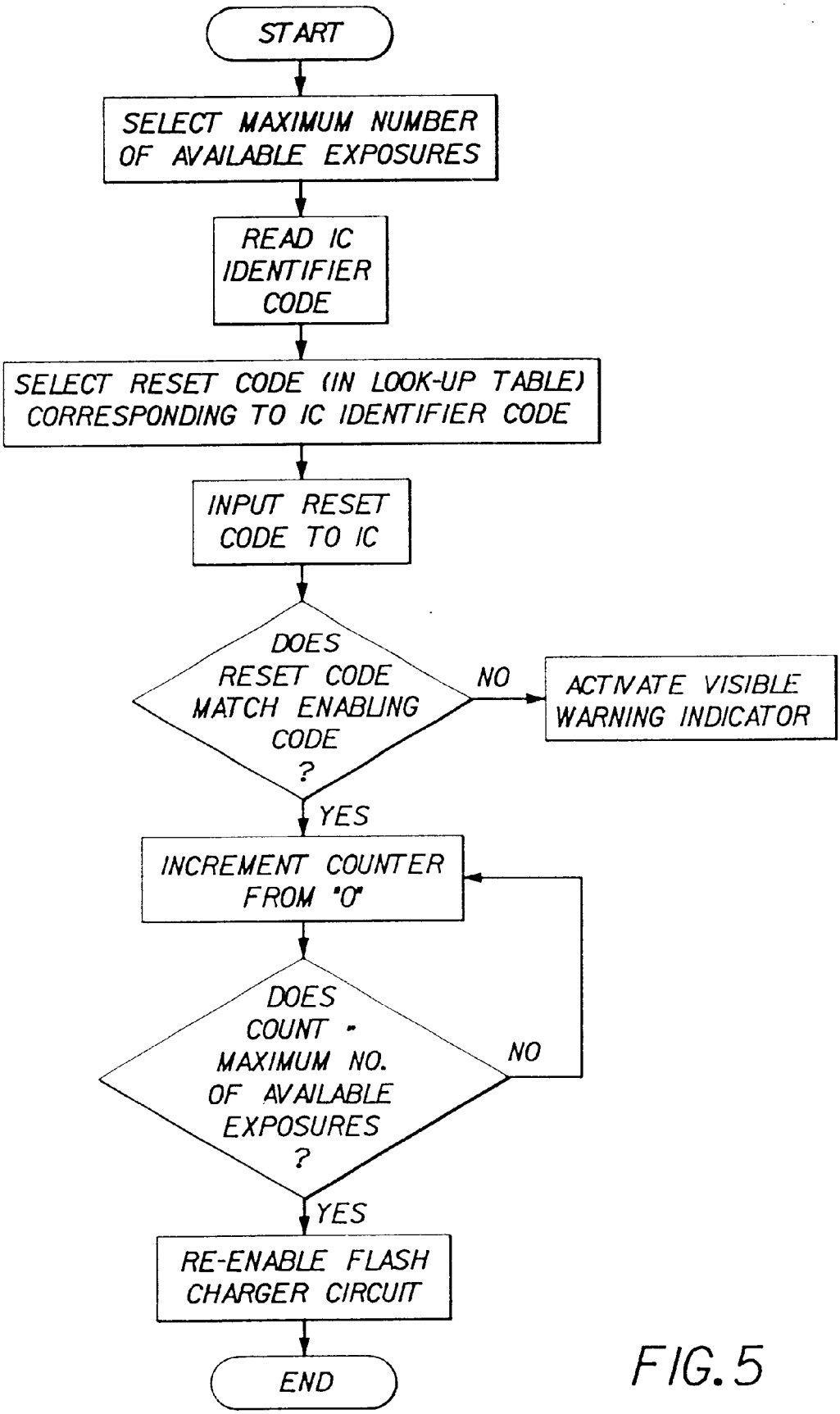
FIG. 5 is a flow chart.

When the flash charger circuit 47 is disabled, the camera 1 cannot be effectively recycled unless authorized. According to the invention, there is provided a method of permitting authorized recycling of the camera 1. This method is depicted in FIG. 5 and comprises the following steps:

(1) The maximum number of exposures available on a fresh roll of film loaded or to be loaded in the camera 1 is selected on a reader 57 by manually sliding a pointer 59 to the selected number "12", "24", or "36". The reader 57 is shown in FIG. 4.

(2) A pair of read pins 61 and 63 of the reader 57 are manually connected to respective mating contacts 65 and 67 of the IC 51 to permit the reader to read an identifier code provided by the IC. Preferably, the identifier code is unique to the IC 51 to make it more difficult to decipher that code and is in electrical digital format, e.g. a binary number. Alternatively, the identifier code can be in electrical analog format instead of electrical digital format, e.g. a predetermined voltage, current, resistance or other value. Also, the identifier code can be optical in nature, such as a bar code, or it can be magnetic in nature.

(3) The reader 57 includes a look-up table 69 having a plurality of identifier codes (for various IC's), one of which is the identifier code that has been read in step 2, and a plurality of reset codes that correspond 1:1 to the identifier codes, and is adapted via a central processing unit (CPU), not shown, to select the reset code that corresponds to the identifier code that has been read in step 2. Also, the plurality of reset codes correspond 1:1 to various enablement codes (provided in respective IC's), one of which is provided in the IC 51 for instructing that IC to trigger initializing the counter 55 and re-enabling the flash charger circuit 47. The reset codes and the enablement codes, like the identifier code, can be a number of different types, e.g. electrical, optical, or magnetic, digital or analog.

(4) A pair of write pins 71 and 73 of the reader 57 are manually connected to respective mating contacts 75 and 77 of the IC 51 to input the reset code that has been selected in step 3 to the IC. Presumably, the reset code of that is inputted to the IC 51 will match the enablement code of that IC. As a result, the counter 55 will be incremented from "0" to the number of exposures selected in step 1 and the flash charger circuit 49 will be re enabled. If the reset code that is inputted to the IC 51 does not match the enablement code of that IC for some reason, a visible warning indicator 79 on the reader 57 is activated.

The invention has been described with reference to a preferred embodiment. However, it will be appreciated that variations and modifications can be effected by a person of ordinary skill in the art without departing from the scope of the invention. For example, instead of disabling the flash charger circuit 49 to prevent the flash function of the camera 1, anyone of several other known functions or operations of the camera 1 such as shutter operation or film advance operation can be disabled. In this sense, the terms "functions" and "operations" are intended to be equivalents. Also, instead of counting the number of closures of the shutter-flash synch switch 53 for the purpose of disabling a function of the camera 1, various other events may be used to determine when to disable a function of the camera. For instance, a function of the camera 1 can be disabled in response to removing an exposed roll of film from the camera, in response to removing a battery from the camera, or in response to opening the inner body 3 to remove the exposed roll of film.

As suggested in commonly assigned U.S. Pat. No. 5,021,811, issued Jun. 4, 1991, the flash circuit board 43 can include means for visibly indicating the number of 5 times the camera 1 has been recycled.

PARTS LIST FOR FIGS. 1–5

1. camera
3. inner housing
5. taking lens
7. shutter blade
9. frame counter
11. flash unit
13. outer cover
15. front opening
17. top opening
19. shutter release button
21. front opening
23. front viewfinder window
25. see through viewfinder
27. rear viewfinder window
29. top opening
31. front opening
33. flash emission window
35. top opening
37. flash-ready fight emitting diode
39. front opening
41. push element
43. flash circuit board
45. flash tube
47. flash charger circuit
49. flash charger circuit switch
51. IC
53. flash-shutter synch switch
55. counter
57. reader
59. pointer
61 & 63. pins
65 & 67. contacts
69. look-up table
71 & 73. pins
75 & 77. contacts
79. warning indicator

What is claimed is:

1. A method of preventing unauthorized recycling of a single-use camera but permitting authorized reuse of the camera, said method comprising the steps of:

determining that a predetermined operation in the camera has been finally concluded;

disabling a function of the camera when it is determined that the predetermined operation in the camera has been finally concluded, to prevent reuse of the camera when an exposed roll of film is replaced in the camera with an unexposed one; and inputting an electrical, optical, or magnetic reset code to the camera to make the function that has been disabled re-enabled, to permit authorized reuse of the camera with the unexposed roll of film.

2. A method of preventing unauthorized recycling of a single-use camera but permitting authorized reuse of the camera, said method comprising the steps of:

maintaining, a count, using a counter in the camera, that indicates the number of exposures made and remaining to be made on a roll of film in the camera;

disabling a function of the camera when the count indicates that the roll of film in the camera is completely exposed, to prevent reuse of the camera when the roll of film is replaced with another one; and inputting an electrical, optical, or magnetic reset code to the camera to cause the counter to be initialized and the function that has been disabled to be re-enabled, to permit authorized reuse of the camera with the other roll of film.

3. A method as recited in claim 2, further comprising the steps of:

reading an identifier code provided on the camera before the reset code is inputted to the camera; and selecting the reset code to be one that corresponds only to the identifier code that has been read.

4. A method as recited in claim 2 or 3, further comprising the step of:

selecting the reset code to be one that matches a non-readable enabling code provided on the camera for triggering initializing the counter and re-enabling the function that has been disabled when the reset code is inputted to the camera.

5. A method of preventing unauthorized recycling of a single-use camera but permitting authorized reuse of the camera, said method comprising the steps of:

maintaining a count, using a counter in the camera, that indicates the number of exposures that have been made and remain to be made on a roll of film in the camera;

disabling a function of the camera when the count indicates that the roll of film in the camera is completely exposed, to prevent reuse of the camera when the roll of film is replaced with another one;

reading an identifier code provided on the camera;

selecting a reset code that corresponds to the identifier code that has been read and which matches a non-readable enabling code provided on the camera for triggering initializing the counter and re-enabling the function that has been disabled;

inputting the reset code to the camera; and initializing the counter and re-enabling the function that has been disabled when the reset code is matched in the camera with the enabling code, to permit authorized reuse of the camera with the other roll of film.

6. Apparatus for preventing unauthorized recycling of a single-use camera but permitting authorized reuse of the camera, said apparatus comprising:

means for determining chat a predetermined operation in the camera has been finally concluded;

means for disabling a function of the camera when it is determined that the predetermined operation in the camera has been finally concluded, to prevent reuse of the camera when an exposed roll of film is replaced in the camera with an unexposed one; and means for inputting an electrical, optical, or magnetic reset code to the camera to make the function that has been disabled re-enabled, to permit authorized reuse of the camera with the unexposed roll of film.

7. Apparatus for preventing unauthorized recycling of a single-use camera but permitting authorized reuse of the camera, said apparatus comprising:

means including a counter in the camera for maintaining a count that indicates the number of exposures that have been made and remain to be made on a roll of film in the camera;

means in the camera for disabling a function of the camera when the count indicates that the roll of film in the camera is completely exposed, to prevent reuse of the camera when the roll of film is replaced with another one; and means for inputting an electrical, optical, or magnetic reset code to the camera to cause said counter to be initialized and the function that has been disabled to be enabled, to permit authorized reuse of the camera with the other roll of film.

8. Apparatus as recited in claim 7, further comprising:

means for reading an identifier code provided on the camera and for selecting the reset code to be one that corresponds only to the identifier code that has been read.

9. A single-use camera comprising:

means for determining that a predetermined event in said camera has occurred;

means for disabling a function of said camera when it is determined that the predetermined event in the camera has occurred, to prevent reuse of the camera when an exposed roll of film in the camera is replaced with an unexposed one; and means for receiving an electrical, optical, or magnetic input reset code to cause the function that has been disabled to be re-enabled, to permit authorized reuse of said camera with the unexposed roll of film.

10. A single-use camera comprising:

a counter for maintaining a count that indicates the number of exposures that have been made and remain to be made on a roll of film in said camera;

means for disabling a function of said camera when the count indicates that the roll of film in the camera has been completely exposed, to prevent reuse of said camera when the roll of film is replaced with another one; and means for receiving an electrical, optical, or magnetic input reset code to cause said counter to be initialized and the function that has been disabled to be re-enabled, to permit authorized reuse of said camera with the other roll of film.

11. A single-use camera as recited in claim 10, further comprising:

means including a non-readable enabling code which, when matched with the input reset code triggers initializing the counter and re-enabling the function that has been disabled.

12. A method of preventing unauthorized recycling of a single-use camera but permitting authorized reuse of the camera, said method comprising the steps of:

determining that a predetermined event in the camera has occurred;

disabling a function of the camera after it is determined that the predetermined event in the camera has occurred, to prevent reuse of the camera; and inputting an electrical, optical, or magnetic reset code to the camera to cause the function that has been disabled to be re-enabled, to permit authorized reuse of the camera.

13. Apparatus for preventing unauthorized recycling of a single-use camera but permitting authorized reuse of the camera, said apparatus comprising:

means for determining that a predetermined event in the camera has occurred;

means for disabling a function of the camera after it is determined that the predetermined event in the camera has occurred, to prevent reuse of the camera; and means for inputting all electrical, optical, or magnetic reset code to the camera to cause the function that has been disabled to be re-enabled, to permit authorized reuse of the camera.

14. A method of preventing unauthorized recycling of a single-use camera but permitting authorized reuse of the camera, said method comprising the steps of:

determining chat a predetermined event in the camera has occurred;

disabling a function of the camera after it is determined that the predetermined event in the camera has occurred, to prevent reuse of the camera;

selecting a reset code which matches an enabling code provided on the camera for re-enabling the function that has been disabled;

inputting the reset code to the camera; and re-enabling the function that has been disabled when the reset code is matched in the camera with the enabling code, to permit authorized reuse of the camera.

15. Apparatus for preventing unauthorized recycling of a single-use camera but permitting authorized reuse of the camera, said apparatus comprising:

means for determining that a predetermined event in the camera has occurred:

means for disabling a function of the camera after it is determined that the predetermined event in the camera has occurred, to prevent reuse of the camera;

means for receiving a reset code; and means including an enabling code which when matched with a reset code that is received operates to re-enable the function that has been disabled, to permit authorized reuse of the camera.

16. Apparatus as recited in claim 15, wherein said enabling code is non-readable.

*17. A method of authorizing reuse of a single-use camera that is automatically functionally disabled, when the camera determines that a predetermined event in the camera has occurred, to prevent unauthorized reuse of the camera, said method comprising the step of:*

*inputting an electrical, optical, or magnetic reset code to the camera to make the function that has been disabled re-enabled, to permit authorized reuse of the camera.*

*18. A method of authorizing reuse of a single-use camera that is automatically functionally disabled, when the camera determines that a predetermined operation of the camera has been finally concluded, to prevent unauthorized reuse of the camera should one replace an exposed roll of film in the camera with an unexposed roll of film, said method comprising the step of:*

*inputting an electrical, optical, or magnetic reset code to the camera to make the function that has been disabled re-enabled, to permit authorized reuse of the camera with the unexposed roll of film.*

*19. A method of authorizing reuse of a single-use camera that is automatically functionally disabled, when a counter in the camera indicates that a roll of film in the camera is exposed, to prevent unauthorized reuse of the camera should one replace the exposed roll with an unexposed roll of film, said method comprising the step of:*

*inputting an electrical, optical, or magnetic reset code to the camera to cause the counter to be initialized and the function that has been disabled to be re-enabled, to permit authorized reuse of the camera with the unexposed roll of film.*

*20. A method of authorizing reuse of a single-use camera that is automatically functionally disabled, when the camera determines that a predetermined event in the camera has occurred, to prevent unauthorized reuse of the camera, said method comprising the steps of:*

*selecting a reset code which matches, an enabling code provided on the camera for re-enabling the function that has been disabled;*

*inputting the reset code to the camera; and*

*re-enabling the function that has been disabled, when the reset code is matched in the camera with the enabling code, to permit authorized reuse of the camera.*

*21. A method of authorizing reuse of a single-use camera that is automatically functionally disabled, when a counter in the camera indicates that a roll of film in the camera is exposed, to prevent unauthorized reuse of the camera should one replace the exposed roll with an unexposed roll of film, said method comprising the steps of:*

*reading an identifier code provided on the camera;*

*selecting a reset code that corresponds to the identifier code that has been read and which matches a non-readable enabling code provided on the camera for triggering initializing the counter and re-enabling the function that has been disabled;*

*inputting the reset code to the camera; and*

*initializing the counter and re-enabling the function that has been disabled, when the reset code is matched in the camera with the enabling code, to permit authorized reuse of the camera with the unexposed roll of film.*

*22. Apparatus for authorizing reuse of a single-use camera that is automatically functionally disabled, when the camera determines that a predetermined event in the camera has occurred, to prevent unauthorized reuse of the camera, said apparatus comprising:*

*means for inputting an electrical, optical, or magnetic reset code to the camera to make the function that has been disabled re-enabled, to permit authorized of the camera.*

*23. Apparatus for authorizing reuse of a single-use camera that is automatically functionally disabled, when the camera determines that a predetermined operation of the camera has been finally concluded, to prevent unauthorized reuse of the camera should one replace an exposed roll of film in the camera with an unexposed roll of film, said apparatus comprising:*

*means for inputting an electrical, optical, or magnetic reset code to the camera to make the function that has been disabled re-enabled, to permit authorized reuse of the camera with the unexposed roll of film.*

*24. Apparatus for authorizing reuse of a single-use camera that is automatically functionally disabled, when a counter in the camera indicates that a roll of film in the camera is exposed to prevent unauthorized reuse of the camera should one replace the exposed roll with an unexposed roll of film, said apparatus comprising:*

*means for inputting an electrical, optical, or magnetic reset code to the camera to cause the counter to be initialized and the function that has been disabled to be re-enabled, to permit authorized reuse of the camera with the unexposed roll of film.*

*25. Apparatus for authorizing reuse of a single-use camera that is automatically functionally disabled, when the camera determines that a predetermined event in the camera has occurred, to prevent unauthorized reuse of the camera, said apparatus comprising:*

*means for selecting a reset code which matches an enabling code provided in the camera for re-enabling the function that has been disabled; and*

*means for inputting the reset code to the camera to cause the enabling code to re-enable the function that has been disabled, to permit authorized reuse of the camera.*

* * * * *